United States Patent [19]

Tanaka et al.

[11] Patent Number: 5,762,828
[45] Date of Patent: Jun. 9, 1998

[54] LIQUID CRYSTAL MEDIUM

[75] Inventors: Yukiomi Tanaka, Kanagawa; Hirosh Numata, Yokohama, both of Japan

[73] Assignee: Merck Patent Gesellschaft mit beschrankter Haftung, Darmstadt, Germany

[21] Appl. No.: 641,037

[22] Filed: Apr. 30, 1996

[51] Int. Cl.⁶ .......................... C09K 19/30; C09K 19/12; C09K 19/52
[52] U.S. Cl. .................. 252/299.63; 252/299.01; 252/299.66
[58] Field of Search .................. 252/299.01, 299.63, 252/299.66

[56] References Cited

U.S. PATENT DOCUMENTS

| | | | |
|---|---|---|---|
| 5,328,644 | 7/1994 | Goulding et al. | 252/299.66 |
| 5,487,845 | 1/1996 | Reiffenrath et al. | 252/299.66 |

OTHER PUBLICATIONS

Goulding et al., "Lateral fluoro substituted 4-alkyl-4"-chloro-1,1':4',1"-terphenyls and derivatives . . . ", Liquid Crystals, 1993, vol. 14, No. 5, pp. 1397-1408.

*Primary Examiner*—Shean C. Wu
*Attorney, Agent, or Firm*—Millen, White, Zelano, & Branigan, P.C.

[57] ABSTRACT

The invention relates to a liquid crystalline medium based on a mixture of polar compounds of positive dielectric anisotropy, characterized in that it contains one or more fluorinated terphenyls having the formula I

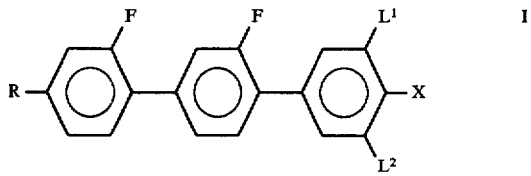

and one or more compounds of the formula II

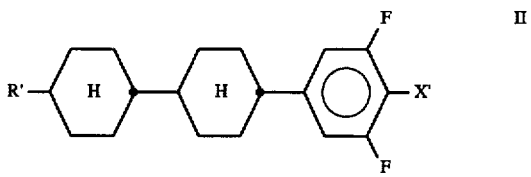

wherein R and R' are each independently an alkyl or alkenyl radical having up to 12 C atoms, optionally substituted by halogen, at least one $CH_2$ group optionally independently replaced by —O—, —CO—O— or —O—CO— in such a manner that oxygen atoms are not linked directly to one another, X and X' are each independently of one another F, Cl, $CF_3$, $OCF_3$ or $OCHF_2$, and $L^1$ and $L^2$ are each independently of one another H or F.

12 Claims, No Drawings

LIQUID CRYSTAL MEDIUM

SUMMARY OF THE INVENTION

The invention relates to a liquid-crystalline medium based on a mixture of polar compounds of positive dielectric anisotropy, characterized in that it contains one or more fluorinated terphenyls having the formula I

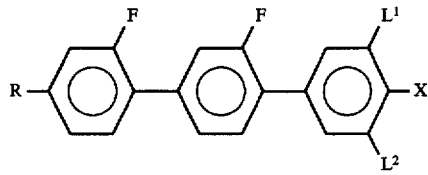

and one more compounds of the formula II

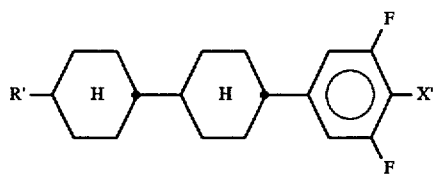

wherein

R and R' are each independently of one another and are an alkyl or alkenyl radical having up to 12 C atoms, these radicals being unsubstituted or substituted by halogen, it also being possible for one or more $CH_2$ groups in these radicals to be replaced, in each case independently of one another, by —O—, —CO—O— or —O—CO— in such a manner that oxygen atoms are not linked directly to one another, and X and X' are each independently of one another F, Cl, $CF_3$, $OCF_3$ or $OCHF_2$, and $L^1$ and $L^2$ are each independently of one another H or F.

Active matrix displays (AMD) are highly favored for commercially interesting displays with a high information content. Such AMDs are used for TV application (e.g. for projection systems) and also for displays for e.g. laptops, automobiles and aeroplanes.

AMDs have non-linear electrical switching elements which are integrated at each picture element. As non-linear driving elements thin film transistors (TFT) [Okubo, U., et al., 1982, SID 82 Digest, pp. 40–41] or diodes (e.g.: metal insulator metal: MIM) [Niwa, K. et al., 1984, SID 84, Digest, pp. 304–307] can be applied. These non-linear driving elements allow to use an electro-optical effect with a rather flat electro-optical characteristic if a good viewing angle characteristic can be obtained. So a TN-type LC cell [Schadt, M. and Helfrich, W., 1971, Appl. Phys. Lett., 18, 127] with a twist angle of 90° can be used. To provide the good contrast over a wide viewing angle, operation in the first minimurrm of transmission [Pohl, L., Eidenschink, R., Pino, F. del., and Weber, G., 1980, German Pat., DBP 30 22 818, and 1981, U.S. Pat. No. 4,398,803; Pohl, L., Weber, G., Eidenschink, R., Baur, G., and Fehrenbach, W., 1981, Appl. Phys. Lett., 38, 497; Weber, G., Finkenzeller, U., Ceelhaar, T., Plach, H. J., Rieger, B., and Pohl, L., 1988, Int. Symp. on Liq. Cryst., Freiburg, to be published in Liq. Crys.] is required. These AMDs are very well suited for TV applications and consequently are of high commercial interest. For these applications some physical properties of the liquid crystals become more important than for passive TN displays. Some of the decisive properties for the performance of an AMD are resistivity and stability of the liquid crystal [Togashi, S., Sekiguchi, K., Tanabe, H., Yamamoto, E., Sorimachi, K., Kajima, E., Watanabe, H., Shimuzu, H., Proc. Eurodisplay 84, September 1984: A 210–288 Matrix LCD Controlled by Double Stage Diode Rings, p.144 ff, Paris; Stromer, M., Proc. Eurodisplay 84, Septemmber 1984: Design of Thin Film Transistors for Matrix Addressing of Television Liquid Crystal Displays, p. 145 ff, Paris]. A problem often encountered is the adverse influence of UV-illumination on the resistivity and therefore on the general performance of the liquid crystal mixture in the display.

In an AMD the non-linear switching elements are addressed in a multiplex scheme. They charge the electrodes of a pixel in the limited time they are active, and then become inactive until they are addressed again in the next cycle. Consequently the change of the voltage on an activated (charged) pixel is a nondesired but a very decisive feature of such a display. The discharge of a pixel is determined by two factors. These are the capacity of the pixel element including liquid crystal and resistivity of the dielectric material between the electrodes, namely the liquid crystal. The characteristic time constant of the decay of the voltage at a pixel (RC-time) has to be significantly bigger than the time between two adressing cycles ($t_{adr}$). A parameter frequently used to describe the performance of an AMD is the voltage holding ratio HR of a picture element:

$$HR = \frac{V(t_o) + V(t_o + t_{adr})}{2V(t_o)}$$

As the voltage at a pixel decays exponentially an increase of the holding ratio necessitates liquid crystal materials with exceptionally high resistivities.

There are several points of importance for the resistivity of the liquid crystal inside a display, e.g. orientation layers, curing condition of the orientation material. But by no means less important are the electrical properties of the liquid crystal used, especially the resistivity of the liquid crystal in the display which determines the magnitude of the voltage drop at the pixel.

Earlier investigations with low-Δn materials have shown, that the requirements with regard to resistivity and UV-stability and, temperature dependence of the resistivity for TFT-applications cannot be met with materials containing cyano moieties as terminal groups. Non-cyano materials containing halogenated terminal groups can show for better resistivity values and UV-stability as well as superior viscosity values than conventionally used cyano materials. However, in general these non-cyano materials unfortunately show a strong tendency towards forming crystalline and/or smectic phases, especially at low temperatures. Also the clearing points and the dielectric anisotropy values of non-cyano materials with halogenated terminal groups are much lower.

Modern commercial mixtures have to operate over a wide temperature range; therefore, crystallization or formation of smectic phases at low temperatures has to be excluded. Good solubility is one of the most important preconditions for the usability of liquid crystalline materials in the development of nematic mixtures. Compounds with high melting temperatures or a tendency to form smectic phases are for this reason not suitable.

By very careful selection of the components and an appropriate mixture design it was possible to find low birefringence non-yano mixtures having a broad nematic temperature range for first minimum application [B. Rieger et al., Proc. 18. Freiburger Arbeitstagung Flüssigkristalle, Freiburg 1989, 16 (1989)]. Non-cyano materials with high birefringence, which are essential for the mixture concept of this invention unfortunately show in many cases even more unfavorable properties such as high melting points and/or strongly smectogenic behavior than similar materials with lower birefringence:

| No. | Chemical structure | Δn | Mesophases (°C.) |
|---|---|---|---|
| 1 | C₃H₇—⟨⟩—⟨⟩—⟨⟩—Cl | 0.126 | K 70 S 79 N 193 I |
| 2 | C₅H₁₁—⟨⟩—⟨⟩—⟨⟩—Cl | 0.199 | K 142 N 192 I |
| 3 | C₅H₁₁—⟨⟩—⟨⟩—⟨⟩—Cl | n.m. | K 105 S 245 I |

The broad general formula of WO 90/09240 covers fluoro terphenyls of the formula I but there is no single example disclosed of these compounds nor of mixtures containing fluorinated fluoro- and chloroterphenyls.

Mixtures of the state of the art with a birefringence suited for operation in the second or a higher transmission minimum of the Gooch-Tarry curve are not acceptable for active matrix application.

There is thus still a great need for liquid-crystal composition having a high resistivity and other suitable material properties for use in AMDs.

The chloroterphenyls; No. 3 as shown above are known from JP 60-56 932-A. As outlined above these compounds do not allow to meet the severe specifications from the electronic industry, especially in view of their limited solubility in other LC materials, their high melting points and their pronounced smectogenity. Accordingly there is also a need in the art for improved non-cyano high birefringence LC compounds.

The chloroterphenyls of formula I have been disclosed in the international LC Conference in Pisa/Italy, 1992, and in U.S. Pat. No. 5,328,644.

The invention has for one of its objectives to provide a liquid crystalline medium based on a mixture of polar compounds of positive dielectric anisotropy, characterized in that it contains one or more fluorinated terphenyls having the formula I

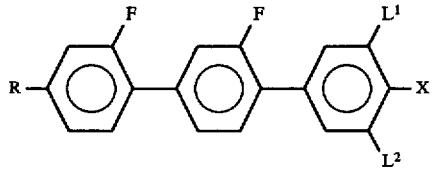

and one more compounds of the formula II

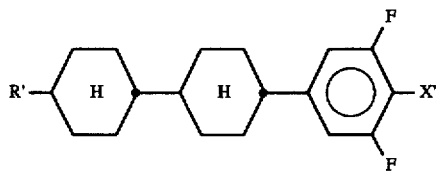

wherein

R and R' are each independently an alkyl or alkenyl radical having up to 12 C atoms, these radicals being unsubstituted or substituted by halogen, it also being possible for one or more CH₂ groups in these radicals to be replaced, in each case independently of one another, by —O—, —CO—O— or —O—CO— in such a manner that oxygen atoms are not linked directly to one another, and X and X' are each independently of one another F, Cl, CF₃, OCF₃ or OCHF₂, and $L^1$ and $L^2$ are each independently of one another H or F. "Alkyl or alkenyl substituted by halogen" includes preferably mono-, di-, tri- and perfluorinated radicals, in particular radicals of formulae $C_nH_{2n+1}$—CHF—$(CH_2)_m$—$(O)_r$—, $C_nF_{2n+1}$—$(CH_2)_m$—$(O)_r$—, in which n is 1 to 8, m is 0 to 4 and r is 0 or 1. Typically, only one CH₂ group will be replaced by —COO— or —OCO—. The preferred meaning of the fluoroalkyl (oxy) groups given for $X^1$ is $C_nF_{2n+1}$—$(CH_2)_m$—$(O)_r$—, in which n is 1 to 8, m is 0 to 4 and r is 0 or 1.

In the compounds of the formulae I and II R and R' are preferably alkyl or alkoxy. X and X' are preferably Cl or F.

The invention has also for its objective to provide a matrix liquid crystal display with high temperature and UV-stability containing two plane parallel support plates which together with a frame form a cell of the thickness d, integrated non-linear elements for switching individual picture elements on the support plates, and a nematic liquid crystal mixture which is present in the cell, has a positive dielectric anisotropy and a birefringence Δn, the display being operated in the second or a higher transmission minimum of the Gooch-Tarry curve by appropriate selection of d, Δn, characterized in that the quotient of the voltage holding ratio $HR_{20}$ after 20 hours exposure to UV-light (280–400 nm, 12 mW/cm²) and $Hr_0$ before exposure to UV-light is larger or equal to 98% and also liquid crystal compositions with a very high resistivity which meet also the other demands.

It has now been found that such values for the HR are even possible for mixtures with higher birefringence by using laterally fluorinated and/or ethyl-linked non-cyano materials. Very high RC time values can be obtained in AMDs. These mixtures also show a reduced viscosity and allow short switching times at reasonable threshold voltages.

The thickness of the AMDs is preferably in the range of 3 to 10 μm. Especially preferred is the range from 3 to 7 μm.

The following preferred embodiments concern the nematic liquid crystal mixture which is present in the AMD:

The liquid crystal mixture preferably comprises one or more compounds of the formula III

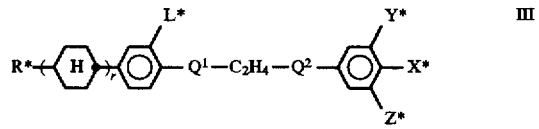

wherein

R* is an alkyl or alkenyl radical having up to 15 C atoms, these radicals being unsubstituted or substituted by halogen, it also being possible for one or more CH₂ groups in these radicals to be replaced, in each case independently of one another, by —O—, —CO—O— or —O—CO— in such a manner that oxygen atoms are not linked directly to one another, r is 0 or 1, X* is F, Cl, CF₃, OCF₃ or OCHF₂, and L*, Y* and Z* are each H or F, and one of $Q^1$ and $Q^2$ is 1,4-phenylene or 3-fluoro-1,4-phenylene and the other residue is a single bond.

The compounds of the formula IIa are particular preferred:

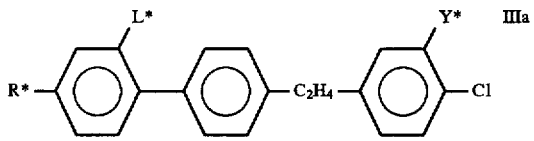

The liquid crystal mixture preferably comprises one or more compounds selected from the formulae IV to VII

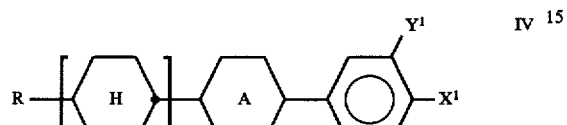

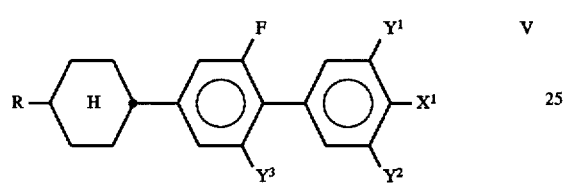

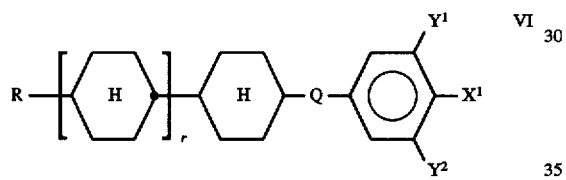

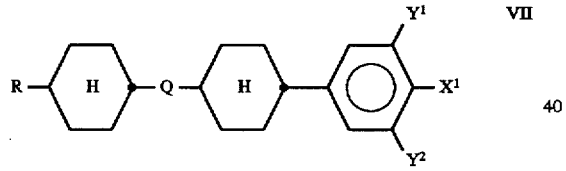

wherein

R is an alkyl or alkenyl radical having up to 12 C atoms, these radicals being unsubstituted or substituted by halogen, it also being possible for one or more $CH_2$ groups in these radicals to be replaced, in each case independently of one another, by —O—, —CO—O— or —O—CO— in such a manner that oxygen atoms are not linked directly to one another, and $X^1$ is F, Cl, $CF_3$, $OCF_3$, $OCHF_2$, fluoroalkyl or fluoroalkoxy in each case having up to 7 carbon atoms, $Y^1$, $Y^2$ and $Y^3$ are each H or F, Q is —$C_2H_4$—, —$C_4H_8$— or —CO—O—,

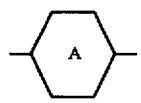

is trans-1,4-cyclohexylene or 1,4-phenylene, and r is 0 or 1, with the proviso the compounds according to formula IV do not have the same meaning as compounds of the formula II.

The liquid crystal mixture preferably comprises one or more compounds of the formula VIII to XII:

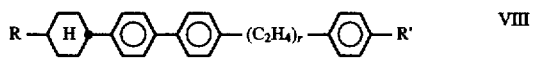

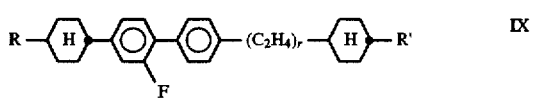

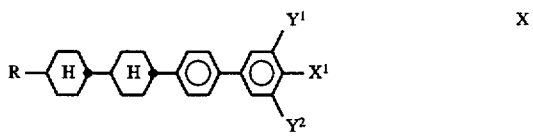

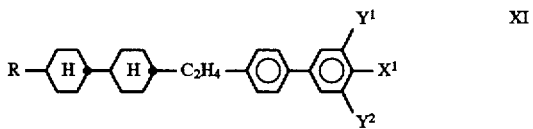

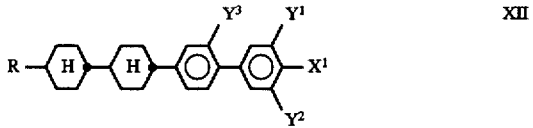

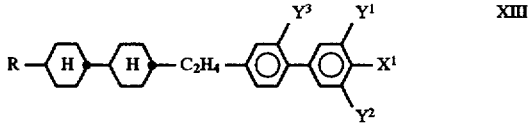

in which

R, r, $X^1$, $Y^1$, $Y^2$, $Y^3$ are each, independently from one another, as defined in claim 4. R' has the same meaning as given for R.

The mixture essentially comprises compounds selected from the group comprising the general formulae I to VII. In the following are given preferred embodiments:

The mixtures contain at least 10% by weight of one or more compounds of the formula I.

The mixtures contain at least 5% by weight of one or more compounds of the formula II.

The mixtures can contain additionally at least one compound of the formula

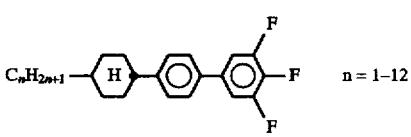

The compounds shown above are known from e.g. DOS 30 42 391, DOS 39 02 328, DOS 39 13 554, DOS 39 09 802, WO 89/02884, WO 90/15113, WO 90/09420, the International Patent Appln. No. PCT/EP 90/01292, No. PCT/EP 91/00411, No. PCT/EP 90/01471, No. PCT/EP 90/02109 and the European Patent Appln. No. 91 100 675.7 or can be prepared in analogy to known compounds.

The mixtures according to the present invention usually are based on the medium polar components having the indicated core structure and other non-cyano components. Of course, however, such mixtures can also additionally contain known cyano LC components, preferably compounds of the formula

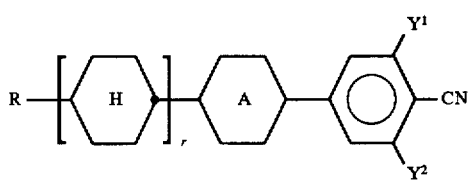

wherein R, r,

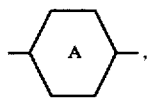

$Y^1$ and $Y^2$ having the meaning given above, if extremely high values for the HR are not needed, e.g. for TN or STN-use. The resulting mixtures are important for achieving very broad nematic phase ranges including very low temperatures (outdoor use).

The mixtures are preferably based on halogenated components of medium polarity and/or are essentially free of cyano components.

The compositions according to the invention contain preferably less than 10%, in particular less than 5%, by weight of mesogenic compounds having a cyano group terminally linked to a benzene ring. Most preferred, they do not contain any such compounds.

The novel compounds of the formula I can be prepared in analogy to the methods described in EO 0 439 089A1, WO 90/09420 WO 90/15113 and WO 91/13850, WO 91/ 00411 the disclosure of which is incorporated here by reference.

In the components of the formulae I to XIII R, R' and R* are preferably a straight-chained alkyl radical of 1 to 7 carbon atoms or is straight-chained methoxy alkyl (methoxymethyl, methoxyethyl, methoxypropyl, methoxybutyl, methoxypentyl, methoxyhexyl, methoxyheptyl).

The preparation of the mixtures according to the invention is effected in the conventional manner. In general, the desired amount of the components which is used in the smaller amount is dissolved in the components which constitutes the main constituent, preferably at elevated temperature. If this temperature is chosen to be above the clear point of the main constituent, the completeness of the process of dissolving can be observed particularly easily.

However, it is also possible to mix solutions of the components in a suitable organic solvent, for example acetone, chloroform or methanol, and to remove the solvent does not introduce any contaminants or undesirable dopants.

By means of suitable additives the liquid crystal phases according to the invention can be modified in such a way that they can be used in any hitherto disclosed kind of AMD.

In the foregoing and in the following examples, all temperatures are set forth uncorrected in degrees Celsius; and, unless otherwise indicated, all parts and percentages are by weight.

The entire disclosure of all applications, patents and publications, cited above and below, is hereby incorporated by reference.

The measurement of HR was performed as described by S. Matsumoto et al. (Liquid Crystals 5, 1320 (1989)) in standard 6μ TN-displays without spacers. Standard floatglass with conductive ITO layers (Balzers) and a rubbed polyimide layer (AL-1051 of Japan Synthetic Rubber) as orientation layer was used. The cells were sealed with an UV-curable adhesive (NOA-61 of Norland) and filled under standard conditions. The liquid crystal mixture was composed of components being carefully purified under standard procedures. UV exposure was performed in a Heraeus-Suntest with a Xenon lamp (1.1 kw, 0.082 W/cm², UV cutoff 310 nm).

In the present patent application and in the following examples all chemical structures of LC compounds are given by acronyms the transformation of which into chemical formulae is done as shown in the following. All residues $C_nH_{2n+1}$ and $C_mH_{2m+1}$ are straight-chained alkyl groups with n resp. m carbon atoms. The code of Table B is selfexplanatory. In Table A only the acronym for the core structure is given. In a concrete this acronym is followed by a dash and a code for the substituents $R^1$, $R^2$, $L^1$, $L^2$ and $L^3$ as follows:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | F | H | H |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | F | H | H |
| nOmFF | $C_nH_{2n+1}$ | $OC_mH_{2m+1}$ | F | H | F |
| nmF | $C_nH_{2n+1}$ | $C_mH_{2m+1}$ | H | H | F |
| nCF$_3$ | $C_nH_{2n+1}$ | CF$_3$ | H | H | H |
| nOCF$_3$ | $C_nH_{2n+1}$ | OCF$_3$ | H | H | H |
| nOCF$_3$ | $C_nH_{2n+1}$ | OCHF$_2$ | H | H | H |
| nS | $C_nH_{2n+1}$ | NCS | H | H | H |
| rVsN | $C_rH_{2r+1}$—CH=CH—$C_sH_{2s}$— | CN | H | H | H |
| rEsN | $C_rH_{2r+1}$—O—$C_2H_{2s}$— | CN | H | H | H |
| nNF | $C_nH_{2n+1}$ | CN | H | H | F |
| nAm | $C_nH_{2n+1}$ | $COOC_mH_{2m+1}$ | H | H | H |
| nF.F.F | $C_nH_{2n+1}$ | F | F | F | H |
| nF.F | $C_nH_{2n+1}$ | F | F | H | H |

TABLE A

| Structure | Code |
|---|---|
| R¹–[pyrimidine]–[phenyl(L³,L¹,L²)]–R² | PYP |
| R¹–[pyridine]–[phenyl(L³,L¹,L²)]–R² | PYRP |
| R¹–[Cy]–[Ph]–[Ph(L³,L¹,L²)]–R² | BCH |
| R¹–[Cy]–[Ph]–[Ph]–[Cy]–R² | CBC |
| R¹–[Cy]–[Cy]–R² | CCH |
| R¹–[Cy]–[Cy]–[Ph(L³,L¹,L²)]–R² | CCP |
| R¹–[Cy]–[Cy]–COO–[Ph(L³,L¹,L²)]–R² | CP |
| R¹–[Cy]–[Ph]–C≡C–[Ph(L³,L¹,L²)]–R² | CPTP |
| R¹–[Cy]–C₂H₄–[Ph]–C≡C–[Ph(L³,L¹,L²)]–R² | CEPTP |

TABLE A-continued

| Structure | Code |
|---|---|
| R¹–[H]–COO–[phenyl with L³,L¹,L²,R²] | D |
| R¹–[H]–C₂H₄–[H]–[phenyl with L³,L¹,L²,R²] | ECCP |
| R¹–[H]–C₂H₄–[H]–[phenyl with L³,L¹,L²,R²] | CECP |
| R¹–[phenyl]–C₂H₄–[phenyl with L³,L¹,L²,R²] | BEP |
| R¹–[phenyl]–C₂H₄–[phenyl with L³,L¹,L²,R²] | ET |
| R¹–[H]–C₂H₄–[phenyl with L³,L¹,L²,R²] | EPCH |
| R¹–[H]–[phenyl]–COO–[phenyl with L³,L¹,L²,R²] | HP |
| R¹–[phenyl]–COO–[phenyl with L³,L¹,L²,R²] | ME |
| R¹–[H]–[phenyl with L³,L¹,L²,R²] | PCH |

TABLE A-continued
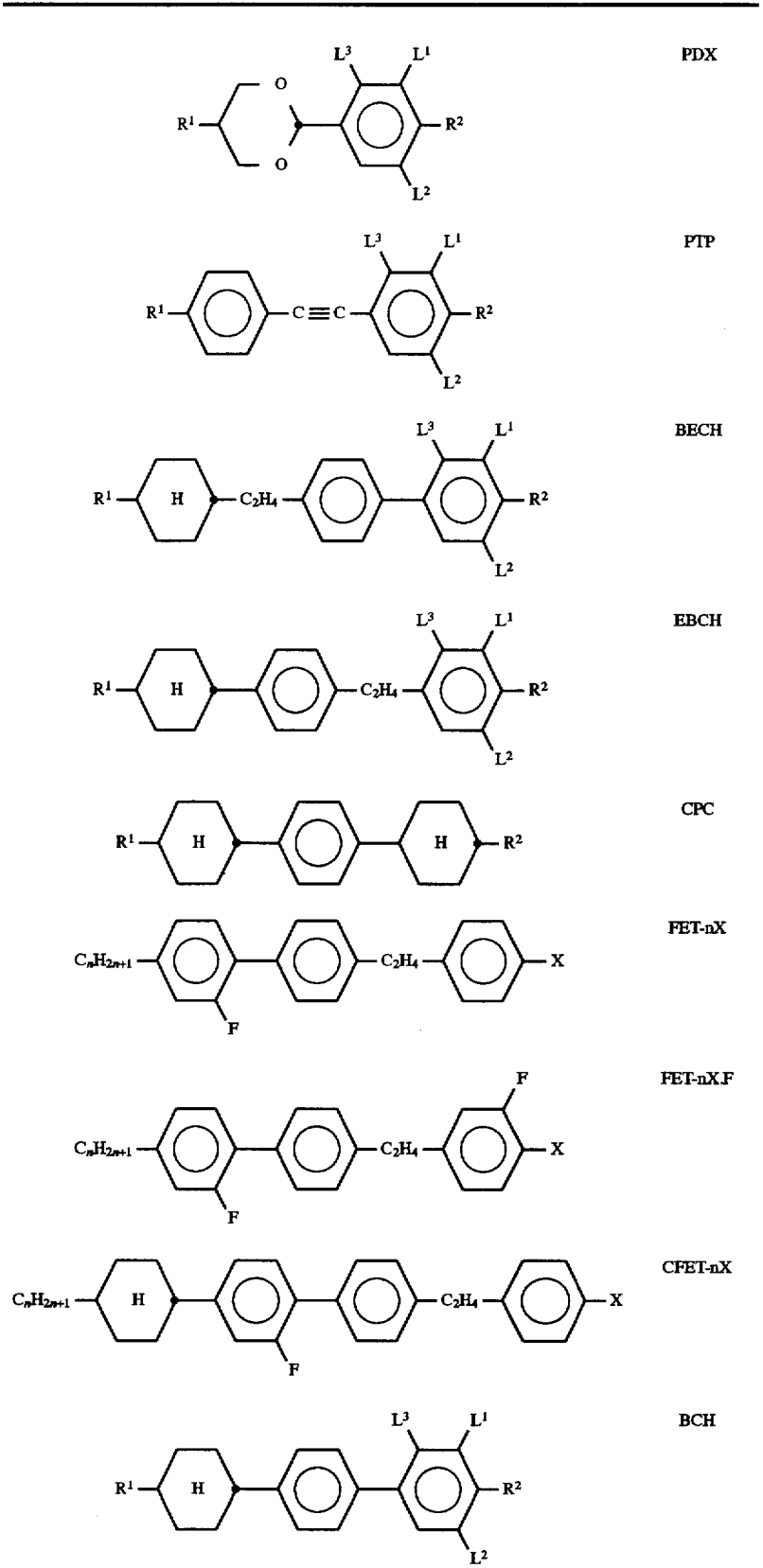

TABLE A-continued
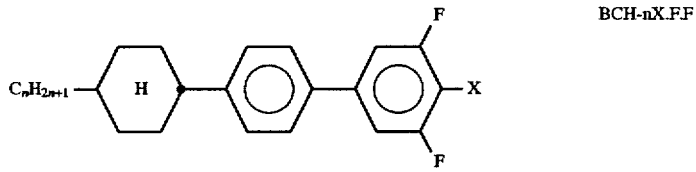 BCH-nX.F
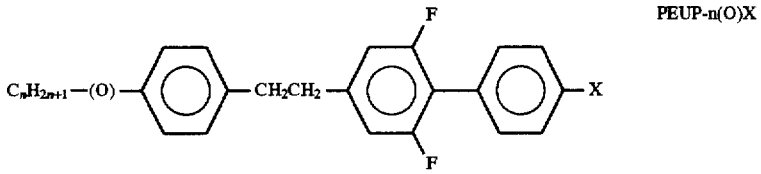 BCH-nX.F.F
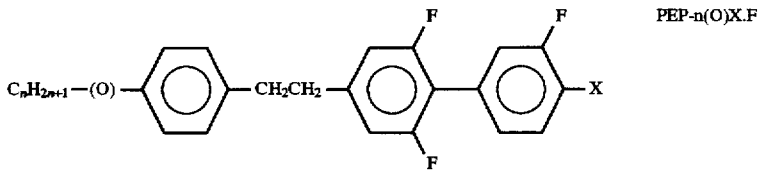 PEUP-n(O)X
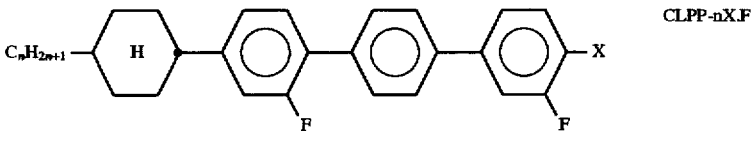 PEP-n(O)X.F
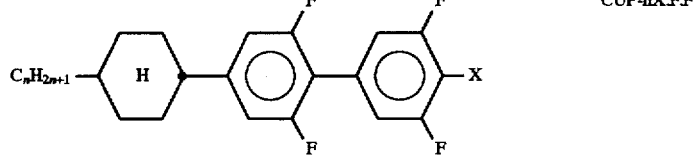 CLPP-nX.F
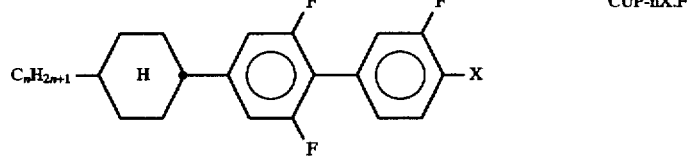 CUP-nX.F.F
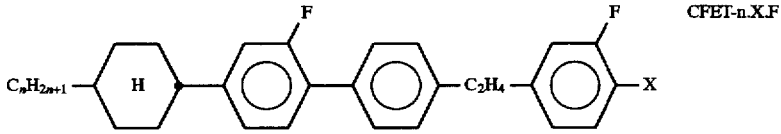 CUP-nX.F
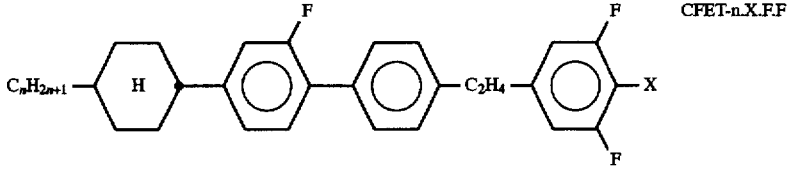 CFET-n.X.F
CFET-n.X.F.F

TABLE A-continued

[Structure: FET-nX.F.F — $C_nH_{2n+1}$-phenyl(2-F)-phenyl-$C_2H_4$-phenyl(F,F)-X]

[Structure: CCP-nX.F.F — $C_nH_{2n+1}$-cyclohexyl-cyclohexyl-phenyl(F,F)-X]

TABLE B

[Structure: T15 — $C_5H_{11}$-phenyl-phenyl-phenyl-CN]

[Structure: K3n — $C_nH_{2n+1}$-phenyl-phenyl-CN]

[Structure: M3n — $C_nH_{2n+1}$-phenyl-phenyl-CN]

[Structure: BCH-n.Fm — $C_nH_{2n+1}$-cyclohexyl-phenyl(F)-$C_mH_{2m+1}$]

[Structure: Inm — $C_nH_{2n+1}$-cyclohexyl-$C_2H_4$-phenyl(F)-phenyl-$C_mH_{2m+1}$]

[Structure: C-nm — $C_nH_{2n+1}$-cyclohexyl-cyclohexyl-OCC-$C_mH_{2m+1}$]

[Structure: CBC-nmF — $C_nH_{2n+1}$-cyclohexyl-phenyl-phenyl(F)-cyclohexyl-$C_mH_{2m+1}$]

[Structure: ECBC-nm — $C_nH_{2n+1}$-cyclohexyl-$C_2H_4$-phenyl-phenyl-cyclohexyl-$C_mH_{2m+1}$]

[Structure: ECCH-nm — $C_nH_{2n+1}$-cyclohexyl-$C_2H_4$-cyclohexyl-$C_mH_{2m+1}$]

[Structure: CCH-n1EM — $C_nH_{2n+1}$-cyclohexyl-cyclohexyl-$CH_2O$-$C_mH_{2m+1}$]

[Structure: T-nFN — $C_nH_{2n+1}$-phenyl-phenyl(F)-phenyl-CN]

TABLE B-continued

[Structure: BCH-nmF — $C_nH_{2n+1}$-cyclohexyl-phenyl(F)-phenyl-$C_mH_{2m+1}$]

[Structure: FT-nFCl — $C_nH_{2n+1}$-phenyl(F)-phenyl(F)-phenyl-Cl]

[Structure: T-nFClF — $C_nH_{2n+1}$-phenyl-phenyl(F)-phenyl(F)-Cl]

[Structure: T-nFFF — $C_nH_{2n+1}$-phenyl-phenyl(F)-phenyl(F,F)-F]

[Structure: CCP-nF.F.F — $C_nH_{2n+1}$-cyclohexyl-cyclohexyl-phenyl(F,F,F)]

EXAMPLES

Example 1

| | | |
|---|---|---|
| FT-3.FCl | 12.0% | Clearing point [°C.]: +97° C. |
| BCH-2F.F | 7.0% | Δn [589 nm, 20° C.]: +0.1191 |
| BCH-3F.F | 9.0% | $V_{(10,0,20)}$: 1.45 V |
| BCH-5F.F | 9.0% | |
| CCP-2F.F.F | 10.0% | |
| CCP-3F.F.F | 13.0% | |
| CCP-5F.F.F | 7.0% | |
| CCP-2OCF$_2$.F.F | 9.0% | |
| CCP-3OCF$_2$.F.F | 9.0% | |
| CCP-5OCF$_2$.F.F | 11.0% | |
| CBC-33F | 4.0% | |

Example 2

| | | |
|---|---|---|
| FT-3.FCl | 10.0% | Clearing point [°C.]: +96° C. |
| CGU-2-F | 11.0% | Δn [589 nm, 20° C.]: +0.1185 |
| CGU-3-F | 10.0% | $V_{(10,0,20)}$: 1.30 V |

| | | |
|---|---|---|
| CGU-5-F | 11.0% | |
| CCP-2F.F.F | 5.0% | |
| CCP-3F.F.F | 5.0% | |
| CCP-5F.F.F | 4.0% | |
| CCP-3OCF$_3$ | 4.0% | |
| CCP-4OCF$_3$ | 4.0% | |
| CCP-5OCF$_3$ | 4.0% | |
| CCP-2OCF$_2$.F.F | 7.0% | |
| CCP-3OCF$_2$.F.F | 8.0% | |
| CCP-5OCF$_2$.F.F | 8.0% | |
| CBC-33F | 3.0% | |
| CBC-53F | 3.0% | |
| CBC-55F | 3.0% | |
| Example 3 | | |
| FT-3.FCl | 12.0% | Clearing point [°C.]: +96° C. |
| BCH-2F.F | 7.0% | $\Delta$n [589 nm, 20° C.]: +0.1192 |
| BCH-3F.F | 9.0% | $V_{(10,0,20)}$: 1.40 V |
| BCH-5F.F | 9.0% | |
| CCP-2F.F.F | 10.0% | |
| CCP-3F.F.F | 13.0% | |
| CCP-5F.F.F | 7.0% | |
| CCP-2OCF$_2$.F.F | 10.0% | |
| CCP-3OCF$_2$.F.F | 10.0% | |
| CCP-5OCF$_2$.F.F | 9.0% | |
| CBC-33F | 4.0% | |
| Example 4 | | |
| FT-3.FCl | 11.0% | Clearing point [°C.]: +96° C. |
| BCH-2F.F | 3.5% | $\Delta$n [589 nm, 20° C.]: +0.1168 |
| BCH-3F.F | 4.5% | $V_{(10,0,20)}$: 1.36 V |
| BCH-5F.F | 4.5% | |
| CCP-2F.F.F | 7.5% | |
| CCP-3F.F.F | 9.0% | |
| CCP-5F.F.F | 5.5% | |
| CCP-2OCF$_2$.F.F | 8.5% | |
| CCP-3OCF$_2$.F.F | 9.0% | |
| CCP-5OCF$_2$.F.F | 8.5% | |
| CGU-2-F | 5.5% | |
| CGU-3-F | 5.0% | |
| CGU-5-F | 5.5% | |
| CCP-3OCF$_3$ | 2.0% | |
| CCP-4OCF$_3$ | 2.0% | |
| CCP-5OCF$_3$ | 2.0% | |
| CBC-33F | 3.5% | |
| CBC-53F | 1.5% | |
| CBC-55F | 1.5% | |
| Example 5 | | |
| FT-3.FCl | 8.0% | Clearing point [°C.]: +95° C. |
| CCP-2OCF$_3$ | 6.0% | $\Delta$n [589 nm, 20° C.]: +0.1219 |
| CCP-3OCF$_3$ | 6.0% | $V_{(10,0,20)}$: 1.46 V |
| CCP-4OCF$_3$ | 6.0% | |
| CCP-5OCF$_3$ | 6.0% | |
| BCH-2F.F | 10.0% | |
| BCH-3F.F | 10.0% | |
| BCH-5F.F | 10.0% | |
| CCP-2F.F.F | 7.0% | |
| CCP-3F.F.F | 7.0% | |
| CCP-5F.F.F | 5.0% | |
| CGU-2F | 5.0% | |
| CGU-3-F | 5.0% | |
| CGU-5-F | 5.0% | |
| CBC-33F | 2.0% | |
| CBC-53F | 2.0% | |
| Example 6 | | |
| FT-3.FCl | 12.0% | Clearing point [°C.]: +102° C. |
| CCP-3OCF$_3$ | 2.0% | $\Delta$n [589 nm, 20° C.]: +0.1200 |
| CCP-4OCF$_3$ | 2.0% | $V_{(10,0,20)}$: 1.51 V |
| CCP-5OCF$_3$ | 2.0% | |
| BCH-2F.F | 8.0% | |
| BCH-3F.F | 8.0% | |
| BCH-5F.F | 8.0% | |
| CCP-2F.F.F | 8.0% | |
| CCP-3F.F.F | 11.0% | |
| CCP-5F.F.F | 7.0% | |
| CCP-2OCF$_2$.F.F | 8.0% | |
| CCP-3OCF$_2$.F.F | 10.0% | |
| CCP-5OCF$_2$.F.F | 10.0% | |
| CBC-33F | 4.0% | |
| Example 7 | | |
| FT-3.FCl | 10.0% | Clearing point [°C.]: +95° C. |
| CGU-2-F | 10.0% | $\Delta$n [589 nm, 20° C.]: +0.1177 |
| CGU-3-F | 10.0% | $V_{(10,0,20)}$: 1.32 V |
| CGU-5-F | 10.0% | |
| CCP-2F.F.F | 5.0% | |
| CCP-3F.F.F | 5.0% | |
| CCP-5F.F.F | 5.0% | |
| CCP-3OCF$_3$ | 4.0% | |
| CCP-4OCF$_3$ | 4.0% | |
| CCP-5OCF$_3$ | 4.0% | |
| CCP-2OCF$_2$.F.F | 9.0% | |
| CCP-3OCF$_2$.F.F | 8.0% | |
| CCP-5OCF$_2$.F.F | 8.0% | |
| CBC-33F | 4.0% | |
| CBC-53F | 4.0% | |
| Example 8 | | |
| FT-3.FCl | 13.0% | Clearing point [°C.]: +92° C. |
| BCH-2F.F | 7.0% | $\Delta$n [589 nm, 20° C.]: +0.1192 |
| BCH-3F.F | 9.0% | $V_{(10,0,20)}$: 1.38 V |
| BCH-5F.F | 9.0% | |
| CCP-2F.F.F | 10.0% | |
| CCP-3F.F.F | 13.0% | |
| CCP-5F.F.F | 7.0% | |
| CCP-2OCF$_2$.F.F | 18.0% | |
| CCP-3OCF$_2$.F.F | 11.0% | |
| CBC-33F | 4.0% | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising a mixture of polar compounds of positive dielectric anisotropy, said mixture comprising at least one fluorinated terphenyl of formula I

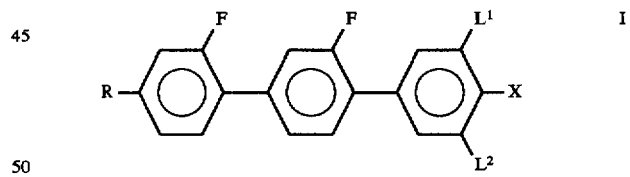

and at least one compound of formula II

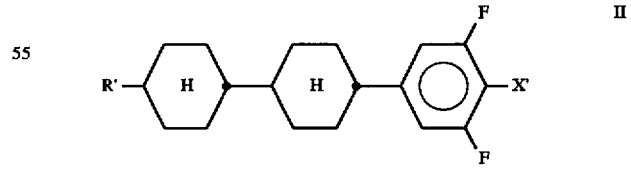

wherein

R and R' are each independently an alkyl or alkenyl radical having up to 12 C atoms, optionally substituted by halogen, at least one CH$_2$ group optionally independently replaced by —O—, —CO—O— or —O—CO— in such a manner that oxygen atoms are not linked directly to one another, X and X' are each independently of one another F, Cl, $CF_3$, $OCF_3$ or $OCHF_2$, and $L^1$ and $L^2$ are each independently of one another H or F.

2. A medium according to claim 1, wherein X and X' are chlorine or fluorine.

3. A medium according to claim 1, wherein R and R' are alkyl or alkoxy.

4. A medium according to claim 2, wherein R and R' are alkyl or alkoxy.

5. A medium according to claim 1, further comprising at least one compound of formula III

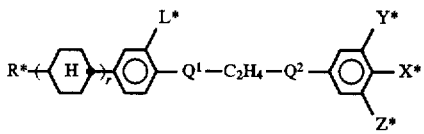

wherein

R* is an alkyl or alkenyl radical having up to 15 C atoms, optionally substituted by halogen, at least one $CH_2$ group optionally independently replaced by —O—, —CO—O— or —O—CO— in such a manner that oxygen atoms are not linked directly to one another, r is 0 or 1, X* is F, Cl, $CF_3$, $OCF_3$ or $OCHF_2$, L*, Y* and Z* are each H or F, and one of $Q^1$ and $Q^2$ is 1,4-phenylene or 3-fluoro-1,4-phenylene and the other is a single bond.

6. A medium according to claim 5, further comprising at least one compound of the formula IIIa

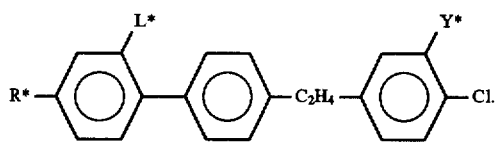

7. A medium according to claim 1, wherein the liquid crystal mixture further comprises at least one compound of formula IV to VII:

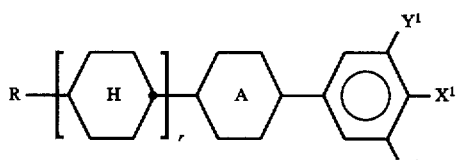

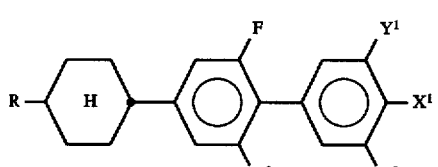

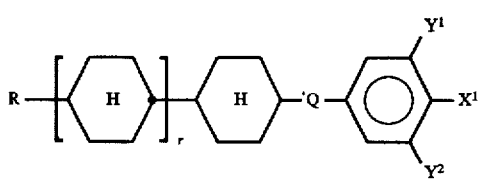

or

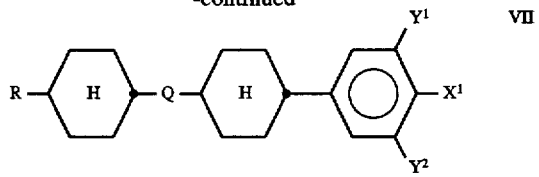

wherein

R is an alkyl or alkenyl radical having up to 12 C atoms, optionally substituted by halogen, at least one $CH_2$ group optionally independently replaced by —O—, —CO—O— or —O—CO— in such a manner that oxygen atoms are not linked directly to one another, $X^1$ is F, Cl, $CF_3$, $OCF_3$, $OCHF_2$, fluoroalkyl or fluoroalkoxy in each case having up to 7 carbon atoms, $Y^1$, $Y^2$ and $Y^3$ are each H or F, Q is —$C_2H_4$—, —$C_4H_8$— or —CO—O—,

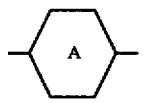

is trans-1,4-cyclohexylene or 1,4-phenylene, and r is 0 or 1, with the proviso that the compounds of the formula IV do not have the same meaning as the compounds of formula II.

8. A medium according to claim 1, further comprising at least one compound of the formula

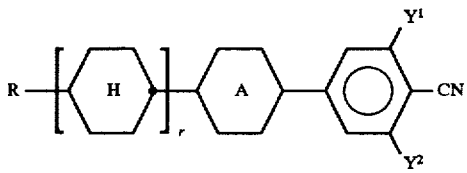

wherein

R is an alkyl or alkenyl radical having up to 12 C atoms, optionally substituted by halogen, at least one $CH_2$ group optionally independently replaced by —O—, —CO—O— or —O—CO— in such a manner that oxygen atoms are not linked directly to one another, $Y^1$ and $Y^2$ are each H or F,

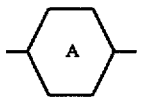

is trans-1,4-cyclohexylene or 1,4-phenylene, and r is 0 or 1.

9. A liquid-crystalline medium comprising a mixture of polar compounds of positive dielectric anisotropy, said mixture comprising at least one fluorinated terphenyl of formula I

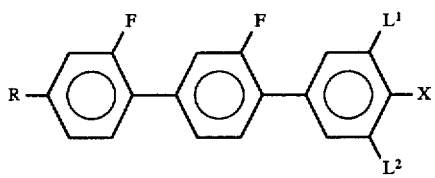

and at least one compound of formula II

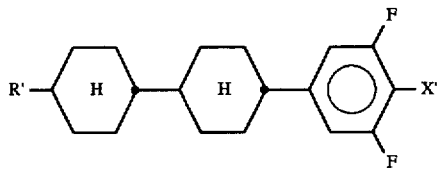

wherein

R and R' are each independently an alkyl or alkenyl radical having up to 12 C atoms, optionally substituted by halogen, at least one $CH_2$ group optionally independently replaced by —O—, —CO—O— or —O—CO— in such a manner that oxygen atoms are not linked directly to one another, X and X' are each independently of one another F, Cl, $CF_3$, $OCF_3$ or $OCHF_2$, and $L^1$ and $L^2$ are each independently of one another H or F, at least one compound of formula III

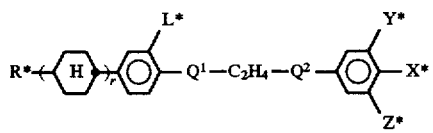

wherein

R* is an alkyl or alkenyl radical having up to 15 C atoms, optionally substituted by halogen, at least one $CH_2$ group optionally independently replaced by —O—, —CO—O— or —O—CO— in such a manner that oxygen atoms are not linked directly to one another, r is 0 or 1, X* is F, Cl, $CF_3$, $OCF_3$ or $OCHF_2$, L*, Y* and Z* are each H or F, and one of $Q^1$ and $Q^2$ is 1,4-phenylene or 3-fluoro-1,4-phenylene and the other is a single bond, and at least one compound of formula IV to VIII

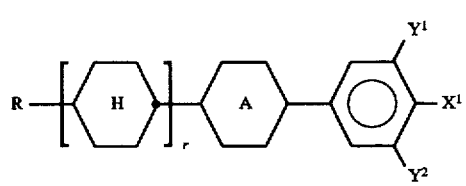

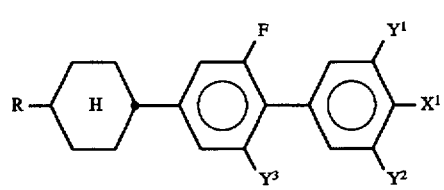

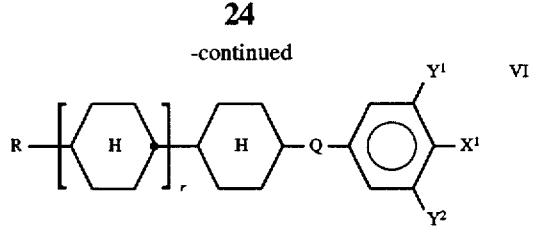

or

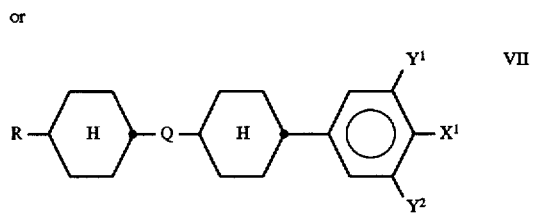

wherein

R is an alkyl or alkenyl radical having up to 12 C atoms, optionally substituted by halogen, at least one $CH_2$ group optionally independently replaced by —O—, —CO—O— or —O—CO— in such a manner that oxygen atoms are not linked directly to one another, $X^1$ is F, Cl, $CF_3$, $OCF_3$, $OCHF_2$, fluoroalkyl or fluoroalkoxy in each case having up to 7 carbon atoms, $Y^1$, $Y^2$ and $Y^3$ are each H or F, Q is —$C_2H_4$—, —$C_4H_8$— or —CO—O—,

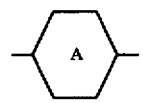

is trans-1,4-cyclohexylene or 1,4-phenylene, and r is 0 or 1, with the proviso that the compounds of the formula IV do not have the same meaning as the compounds of formula II.

10. A liquid-crystalline medium comprising a mixture of polar compounds of positive dielectric anisotropy, said mixture consisting of at least one fluorinated terphenyl of formula I

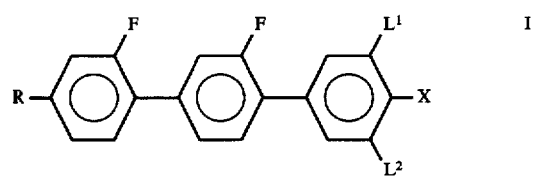

and at least one compound of formula II

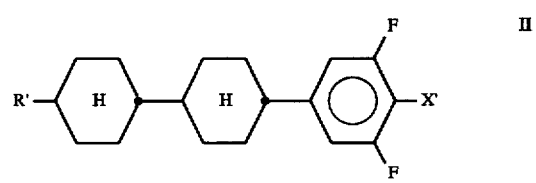

wherein

R and R' are each independently an alkyl or alkenyl radical having up to 12 C atoms, optionally substituted by halogen, at least one $CH_2$ group optionally independently replaced by —O—, —CO—O— or —O—CO— in such a manner that oxygen atoms are not linked directly to one another, X and X' are each independently of one another F, Cl, $CF_3$, $OCF_3$ or $OCHF_2$, and $L^1$ and $L^2$ are each independently of one another H or F.

at least one compound of formula III

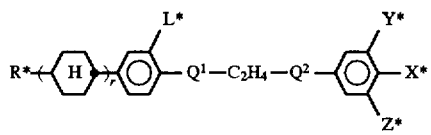

wherein

R* is an alkyl or alkenyl radical having up to 15 C atoms, optionally substituted by halogen, at least one $CH_2$ group optionally independently replaced by —O—, —CO—O— or —O—CO— in such a manner that oxygen atoms are not linked directly to one another, r is 0 or 1, X* is F, Cl, $CF_3$, $OCF_3$ or $OCHF_2$, L*, Y* and Z* are each H or F, and one of $Q^1$ and $Q^2$ is 1,4-phenylene or 3-fluoro-1,4-phenylene and the other is a single bond, and at least one compound of formula IV to VIII

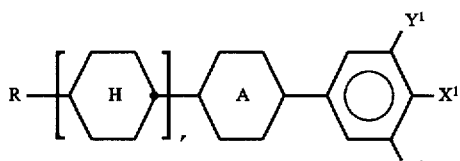

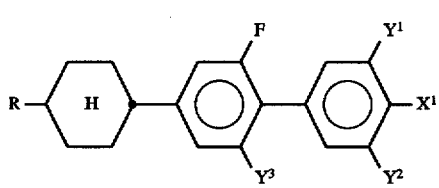

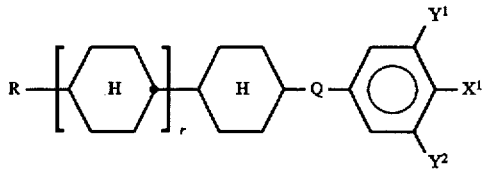

or

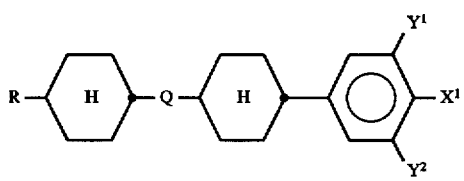

wherein

R is an alkyl or alkenyl radical having up to 12 C atoms, optionally substituted by halogen, at least one $CH_2$ group optionally independently replaced by —O—, —CO—O— or —O—CO— in such a manner that oxygen atoms are not linked directly to one another, $X^1$ is F, Cl, $CF_3$, $OCF_3$, $OCHF_2$, fluoroalkyl or fluoroalkoxy in each case having up to 7 carbon atoms, $Y^1$, $Y^2$ and $Y^3$ are each H or F, Q is —$C_2H_4$—, —$C_4H_8$— or —CO—O—,

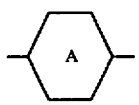

is trans-1,4-cyclohexylene or 1,4-phenylene, and r is 0 or 1, with the proviso that the compounds of the formula IV do not have the same meaning as the compounds of formula II.

11. A mixture according to claim 1, containing at least 10% by weight of compounds of formula I with at least 5% by weight of compounds of formula II.

12. A matrix liquid crystal display with high temperature and UV-stability containing two plane parallel support plates which together with a frame form a cell of the thickness d, integrated non-linear elements for switching individual picture elements on the support plates, and a nematic liquid crystal mixture which is present in the cell, having a positive dielectric anisotropy and a birefringence Δn, the display being operated in the second or a higher transmission minimum of the Gooch-Tarry curve by appropriate selection of d.Δn, wherein the quotient of the voltage holding ratio $HR_{20}$ after 20 hours exposure to UV-light (280–400 nm, 12 mW/cm$^2$) and $HR_0$ before exposure to UV-light is larger or equal to 98%, and wherein the liquid crystalline mixture is a medium according to claim 1.

* * * * *